(12) United States Patent
Krämer

(10) Patent No.: US 8,020,852 B2
(45) Date of Patent: Sep. 20, 2011

(54) DEVICE FOR THE TORQUE LIMITATION IN A MACHINE FOR PROCESSING MEANS OF PAYMENT

(75) Inventor: Walter Krämer, Wiedergeltingen (DE)

(73) Assignee: Giesecke & Devrient GmbH, Munich (DE)

( * ) Notice: Subject to any disclaimer, the term of this patent is extended or adjusted under 35 U.S.C. 154(b) by 264 days.

(21) Appl. No.: 12/392,756

(22) Filed: Feb. 25, 2009

(65) Prior Publication Data
US 2009/0218753 A1  Sep. 3, 2009

Related U.S. Application Data

(60) Provisional application No. 61/091,913, filed on Aug. 26, 2008.

(30) Foreign Application Priority Data

Feb. 26, 2008  (DE) .................. 10 2008 011 083

(51) Int. Cl.
*B65H 3/06*  (2006.01)

(52) U.S. Cl. ............... 271/109; 74/593; 310/103; 492/8
(58) Field of Classification Search .................. 271/109; 74/593; 310/103–105; 492/8
See application file for complete search history.

(56) References Cited

U.S. PATENT DOCUMENTS 5,967,504 A * 10/1999 Yankloski ..................... 271/110
6,286,659 B1 * 9/2001 Petrovic ....................... 198/780

* cited by examiner

*Primary Examiner* — Gerald McClain
(74) *Attorney, Agent, or Firm* — Bacon & Thomas, PLLC

(57) ABSTRACT

The present invention relates to a device for the torque limitation in a machine for processing means of payment. The invention has use as a device for limiting torque in a machine for processing means of payment, wherein the device for the torque limitation includes two elements transmitting a torque, the two elements having magnets which are disposed in the two elements with an angular distribution of the same kind, the magnets connecting the two elements to each other in a non-positive fashion, and the connection of the two elements being disrupted when a maximum transmittable torque is exceeded.

6 Claims, 2 Drawing Sheets

DEVICE FOR THE TORQUE LIMITATION IN A MACHINE FOR PROCESSING MEANS OF PAYMENT

CROSS-REFERENCE TO RELATED APPLICATIONS

This application claims the benefit under 35 USC 119(e) of U.S. Application No. 61/091,913 filed Aug. 26, 2008, the entirety of which is incorporated by reference herein.

BACKGROUND

Field

The present invention relates to a device for the torque limitation in a machine for processing means of payment.

In the following means of payment shall mean bank notes, checks, vouchers, coupons and coins. Processing means of payment shall mean the automatic processing of means of payment for example with bank note processing machines, coin processing machines etc, which are operated by operators in order to, in particular, check, count and account the means of payment.

With the automatic processing of means of payment, for example, certain quantities of means of payment are handed in by depositors to an authority effecting the automatic processing, e.g. a bank, in order to be accounted, so that the total value of the means of payment can be credited e.g. to a bank account of the depositor.

Here it can occur that the operator or the depositor comes in contact with moving parts of the machine effecting the automatic processing, the result of which can be a risk of injury for the operator.

Likewise, a damage of the machine effecting the automatic processing of the means of payment can occur. It can occur, for example, that foreign objects are between the bank notes inputted by the operator, which are thicker and harder than the bank notes and during the processing, e.g. singling of the bank notes, would lead to a damage of the machine effecting the automatic processing of the means of payment.

Further damage of the machine effecting the automatic processing of the means of payment can occur, when components of the machine inserted by the operator into the machine, e.g. cassettes for receiving means of payment, are not properly inserted into the machine.

All the cases described by way of example have in common, that too high torques can cause injuries of the operator or damage of the machine effecting the automatic processing of the means of payment, in particular of a drive of the machine.

SUMMARY

Therefore, it is the object of the present invention to provide a device for the torque limitation in a machine for processing means of payment, which has an especially simple structure and permits a reliable limitation of torques.

This object is achieved according to the invention by the features of the independent claim.

The invention starts out from a device for the torque limitation in a machine for processing means of payment, the device for the torque limitation having two elements transmitting a torque, the two elements having magnets which are disposed in the two elements with an angular distribution of the same kind, the magnets connecting the two elements to each other in a non-positive fashion, and the connection of the two elements being disrupted, when a maximum of transmittable torque is exceeded.

The advantage of the invention in particular is that with the help of the two elements a safety coupling especially simple to realize can be realized, which has an exactly defined maximum transmittable torque. Moreover, the device works wear-free with magnetic forces.

In an advantageous development it is provided, that the two elements of the device have depressions and elevations, which are disposed on the adjacent surfaces of the two elements with an angular distribution of the same kind, in particular with cylindrical depressions and spherical elevations.

The advantageous development has the advantage, that the maximum torque transmittable by the device can be easily increased, without there having to be made especially high demands on the magnetic forces of the magnets used in the elements.

DESCRIPTION OF THE DRAWINGS

Further advantages of the present invention appear from the dependent claims as well as the following description of an embodiment with reference to Figures.

DETAILED DESCRIPTION OF PREFERRED EMBODIMENTS

Figure 1:
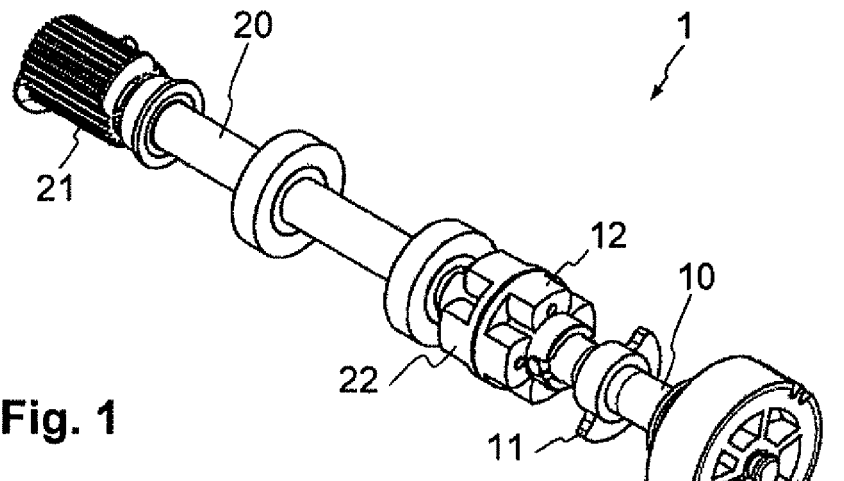
FIG. 1 shows an embodiment of a device for the torque limitation in a machine for processing means of payment on transmitting a torque.
Figure 4:
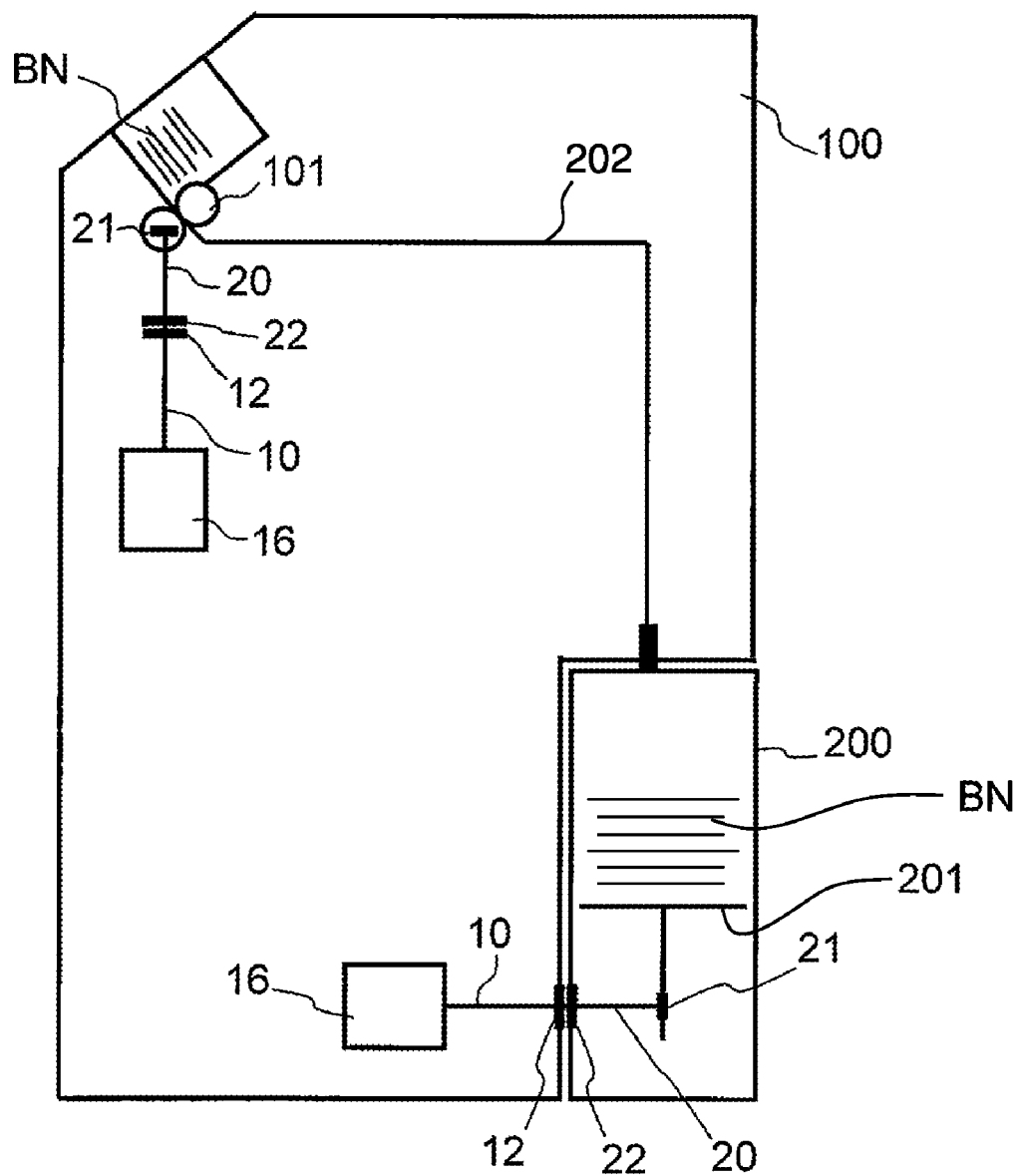
FIG. 4 shows a schematic view of a machine for processing payment means.

In FIG. 1 is shown an embodiment of a device for the torque limitation in a machine for processing means of payment on transmitting a torque. In the shown embodiment a torque of a drive or a motor 16 is transmitted with the help of a shaft 10, 20 consisting of two parts to a toothed wheel 21 which e.g. with the help of a toothed belt drives parts of the machine for processing means of payment. For example, as shown in FIG. 4, the device for torque limitation may used in a machine 100 for processing means of payment in combination with a singler 101 or a mechanism 201 disposed in a cassette 200 for receiving means of payment, e.g. for receiving bank notes BN in a singler 101, and transporting the bank notes on path 202 and stacking the bank notes BN in the cassette 200. Between the two shaft parts 10, 20 there are disposed two elements 12, 22 for limiting the transmitted torque, which form a safety coupling. The two elements 12, 22 can be formed in a disk-shaped fashion. Each of the two elements 12, 22 is firmly connected with one end of the two shaft parts 10, 20. For monitoring a rotational speed that has to be observed when operating the shaft 10, 20, a clocking disk 11 can be provided, which is firmly connected with the shaft. With the help of a not shown forked light barrier, which is disposed in the rotating area of the clocking disk 11 the rotational speed of the shaft can be determined by evaluating the output signal of the forked light barrier.

Figure 2:
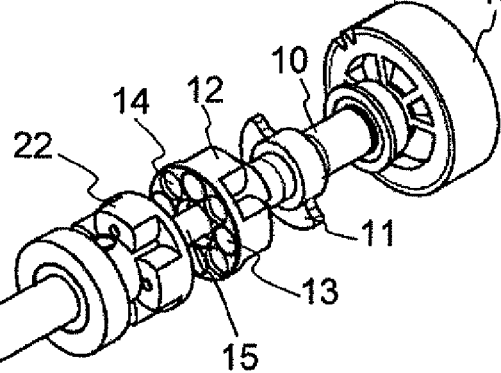
FIGS. 2 and 3 show substantial component parts of the device shown in FIG. 1.
Figure 3:
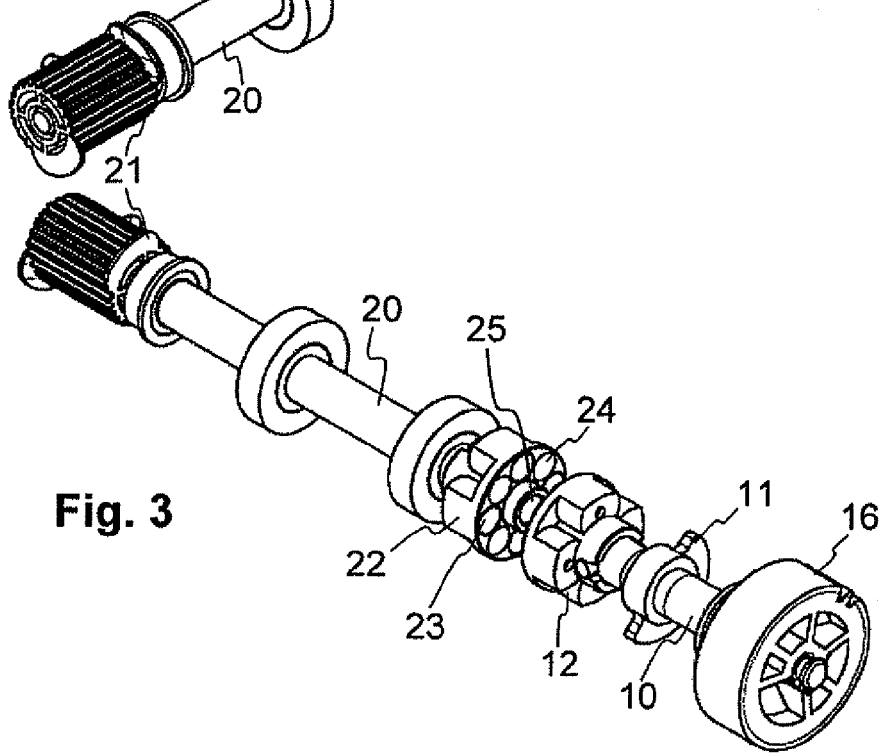

FIGS. 2 and 3 show the shaft 10, 20 consisting of two parts in a separated state. Here the surfaces of the element 12, 22 forming the safety coupling, that adjoin each other when transmitting a torque, become visible. The first element 12 mounted at the first shaft part 10 has magnets 13. Additionally, the first element 12 can have depressions 14, which can be formed e.g. cylindrical. Moreover, the first shaft part 10 can have a tapered extension 15, which protrudes beyond the surface of the first element 12. The second element 22 mounted at the second shaft part 20 has magnets 23. Additionally, the second element 22 can have elevations 24, which can be formed e.g. as spheres. Moreover, the second shaft part 20 can have a bush-shaped bore 25.

When first and second shaft part 10, 20, as shown in FIG. 1, are brought together, the extension 15 of the first shaft part 10 moves into engagement with the bush 25 of the second shaft part 20. The magnets 13 of the first element 12 and the magnets 23 of the second element 22 attract each other and connect the first element 12 and the second element 22 with each other in a non-positive fashion, so that their surfaces adjoin each other. It is obvious, that the pole direction of the magnets 13 and 23 must be chosen such that the magnets 13 of the first element 12 and the magnets 23 of the second element 22 attract each other. For example, the magnets 13 of the first element 12 are inserted such that they have a north pole at the surface of the first element 12, whereas the magnets 23 of the second element 22 are inserted such that they have a south pole at the surface of the second element 22. In the shown example with four magnets per element, then first and second element are connected with each other after a quarter turn at the latest. But it is also possible, that in both elements for example a north pole follows a south pole. In the shown example with four magnets per element, then first and second element are connected with each other after a half turn at the latest.

By choosing number, type and size of the magnets 13, 23 and the size, i.e. the diameter, of the elements 12, 22 of the device for the torque limitation, or the distance between the magnets 13, 23 and the axial center of the shaft 10, 20, there can be determined the maximum transmittable torque. If, for example, a diameter of 20 millimeters is chosen for the elements 12, 22 and if four permanent magnets of the REFeB type with a degree of magnetization N52 and 5 millimeters diameter at a length of 6 millimeters are chosen and disposed concentric to the axis of the shaft 10, 20, a maximum torque of 0.18 Nm can be transmitted.

When bringing together the first and second element 12, 22, moreover, the possibly additionally provided elevations 24 of the second element 22, which e.g. are formed as spheres, move into engagement with the possibly additionally provided, for example, cylindrical depressions 14 of the first element 12. In this way first and second element 12, 22 can be positively connected, when viewed in the direction of rotation. With that the torque transmittable by the device for the torque limitation can be increased. The effect of the elevations 24 and depressions 14, which increases the maximum transmittable torque, substantially depends on their dimensions, in particular on the height and depth of the elevations 24 and depressions 14, respectively, and their form. Instead of providing the elevations and depressions each on one of the elements, elevations and depressions can be alternately provided on the two elements.

When the torque transmitted by the shaft 10, 20 exceeds the maximum permissible value, e.g. because the singler for bank notes is blocked by foreign objects, the retention forces of the magnets 13, 23 are exceeded and the device for the torque limitation effects a disruption of the shaft 10, 20 between first and second element 12, 22. When, optionally, the above-described depressions 14 and elevations 24 are provided, the transmittable torque is increased respectively, so that for achieving the desired torque lower magnetic forces are sufficient.

When the cause, that effects the exceeding of the maximum torque, is eliminated, first and second shaft part 10, 20 are re-connected with each other with the help of first and second element 12, 22 as described above, so that a torque can be transmitted until the maximum permissible torque. Here the elements 12, 22 and thus the shaft parts 10, 20 are put together again and held together by the magnetic forces of the magnets 13, 23 used.

In particular when the described depressions 14 and elevations 24 in the surfaces of the elements 12, 22 are used, it can be provided, that one of the elements 12, 22 is mounted movable in axial direction on the respective shaft part 10, 20. This permits that in the case the maximum transmittable torque is exceeded the movably mounted element 12, 22 can evade. The permissible axial movability here can approximately correspond to the height of the elevations 24.

In the described embodiment first and second element 12, 22 of the device for the torque limitation each have four magnets 13, 23. It is obvious, that more or less than four magnets per element 12, 22 can be used. Here it is required, that the magnets 13 of the first element 12 and the magnets 23 of the second element 22 have an angular distribution of the same kind. The same applies for the optionally provided four elevations 24 or depressions 14 per element 22 or 12.

As shown, elements 12, 22 are formed in a disk-shaped fashion, but it is obvious, that the elements 12, 22 can also have a different form, in order to in particular accommodate the magnets 13, 23.

From the Figures and the description of the action principle of the device for the torque limitation it obviously appears, that the device for the torque limitation is suitable to effect a torque limitation in both directions of rotation.

Likewise, from the Figures and their description results that the two shaft parts 10, 20 are separable. For example, the second shaft part 20 can be component part of a cassette, the first shaft part 10 can be disposed in the machine for processing means of payment. Thus the cassette and with that the second shaft part 20 can be easily flanged to the machine for processing means of payment and thus to the first shaft part 10, to permit the driving of the elements located in the cassette.

The invention claimed is:

1. A device for the limiting torque in a machine for processing payments, comprising:
two elements arranged to transmit a torque, the two elements having magnets which are disposed therein with an angular distribution of the same kind, the magnets connecting the two elements to each other in a non-positive fashion, wherein the torque transmitting connection of the two elements is interrupted when a maximum transmittable torque is exceeded;
wherein the two elements have depressions and elevations which are disposed on adjacent surfaces of the two elements with magnets having an angular distribution of the same kind;
wherein the depressions are cylindrical and the elevations are spherical.

2. The device according to claim 1, wherein the two elements are formed in a disk-shaped fashion.

3. The device according to claim 1, wherein a first of the two elements is connected with a first shaft part, and a second of the two elements is connected with a second shaft part, the first shaft part having an extension and the second shaft part having a bush, wherein the extension of the first shaft part is sunk in the bush of the second shaft part when first and second elements are connected.

4. The device according to claim 1, for use as a singler of a machine for processing payments.

5. The device according to claim 1, for use with a cassette for receiving payments used with a machine for processing payments.

6. The device according to claim 5, wherein one of the two elements is a component part of the cassette, whereas the other one of the two elements is a component part of a machine for processing payments.

* * * * *